Jan. 29, 1935. G. L. HANN 1,989,615
METHOD OF AND APPARATUS FOR THE REDUCTION OF GRANULAR MATERIALS
Filed Nov. 10, 1930
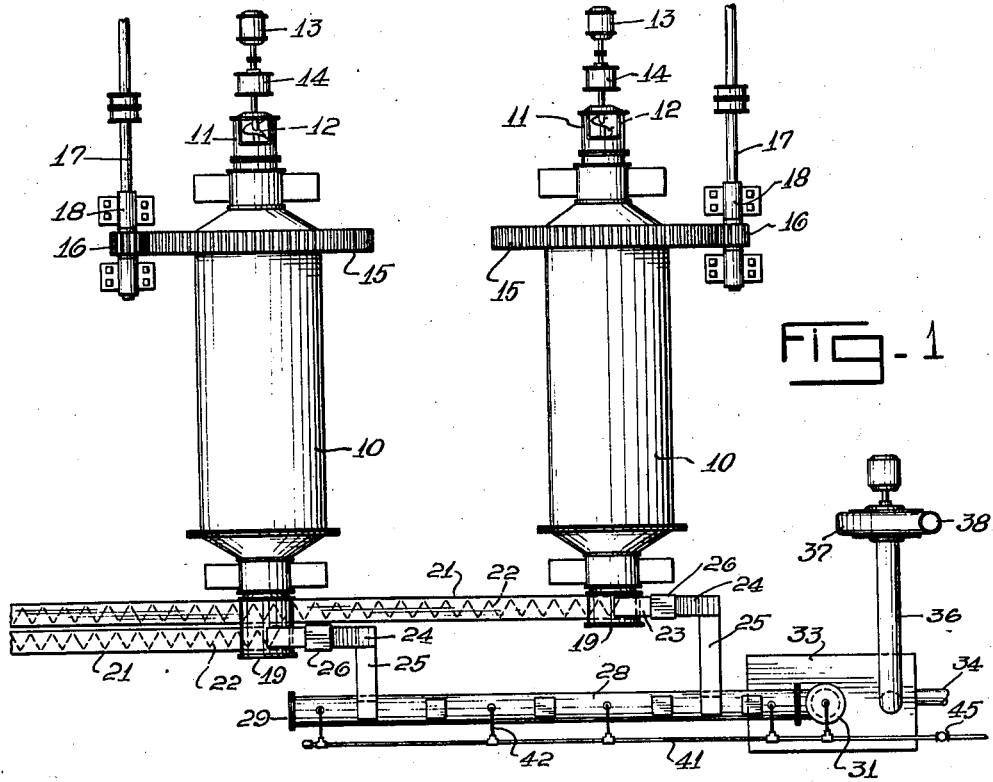
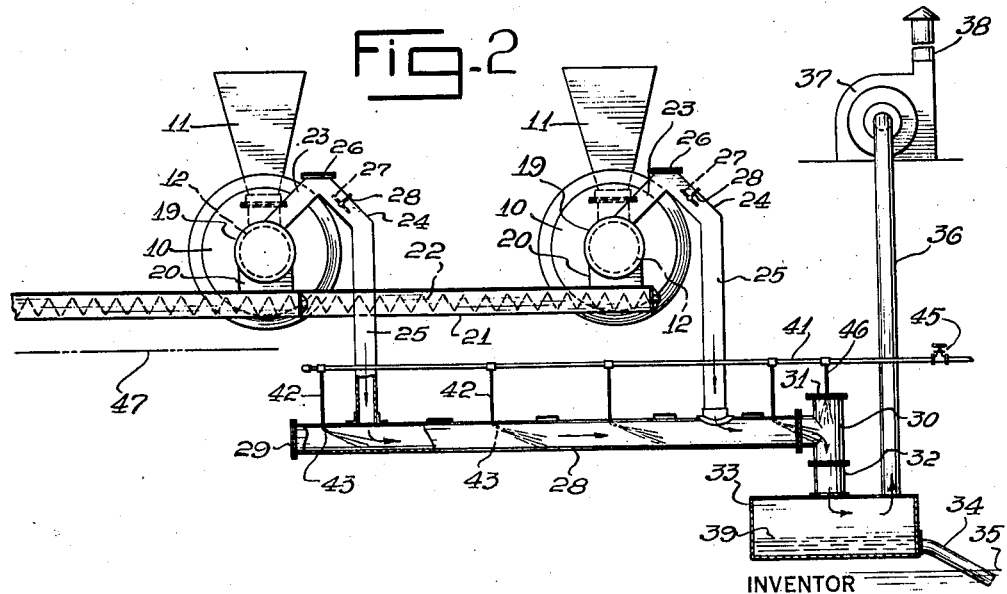
INVENTOR
GEORGE L. HANN.
BY
L. A. Paley
ATTORNEY Patented Jan. 29, 1935

1,989,615

UNITED STATES PATENT OFFICE 1,989,615

METHOD OF AND APPARATUS FOR THE REDUCTION OF GRANULAR MATERIALS

George L. Hann, New Brighton, Staten Island, N. Y., assignor to United States Gypsum Company, Chicago, Ill., a corporation of Illinois Application November 10, 1930, Serial No. 494,471

3 Claims. (Cl. 83—94)

This invention relates to the reduction of the particle size of powdered materials and has reference more particularly to a method of and apparatus for the reduction of such powdered materials as calcined gypsum, in tube mills or ball mills.

In the manufacture of calcined gypsum, such as the products commonly called first settle and second settle stucco, it is standard practice to calcine the gypsum in a kettle, and while the gypsum is still hot from the calcination, it is transferred to buhr mills for an initial grinding operation. The friction of grinding serves to maintain the temperature and prevent the calcined gypsum from cooling down, and while in this hot state of 325 tc 350° F. it is transferred to tube or ball mills where the fineness is again considerably increased for certain uses. During the tube milling operation, a considerable amount of steam is formed from the excess of water contained in the calcined gypsum, and if this steam is not removed from the tube mill, the resulting calcined gypsum does not keep very well and suffers a partial rehydration upon storing for prolonged periods, possibly due to the retained and condensed water again recombining with the calcined gypsum. The high temperature in the tube mill is maintained by reason of the heat of friction generated within the tube mill. Failure to remove this steam from the tube mill, also makes it difficult to control the setting time of the calcined gypsum, and as a result the working qualities of the calcined gypsum for plaster or other plastics are not good and are not uniform. If the steam is not removed from the tube or ball mill, a certain amount of condensation may take place in the conveying equipment which removes the calcined gypsum from the tube or ball mill, and this condensed moisture causes a corrosion of the conveying equipment with resulting high maintenance cost. The tube mills and ball mills may also create an objectionable dust nuisance if the dust is not properly taken care of.

An object of this invention, therefore, is to provide a process of and apparatus for removing steam generated in a tube or ball mill operating upon calcined gypsum or other powdered material, so that the qualities of the resulting products are maintained at a high level.

Another object of the invention is to provide a method of removing steam from the tube or ball mills so that the condensation of moisture is prevented in conveying equipment with the resulting elimination of corrosion.

A further object of the invention is to provide a method and apparatus for eliminating any dust nuisance incident to the operation of tube and ball mills operating upon calcined gypsum.

Reference is to be had to the accompanying drawing forming a part of this specification, in which Fig. 1 is a plan view of a plant layout of tube mills embodying my improved steam removal devices, and Fig. 2 is an end elevation partly in section of the devices shown in Fig. 1.

One or more tube mills 10 of standard design, may be provided for grinding calcined gypsum or other powdered material, which is admitted through the hollow shaft at one end of the tube mill by a hopper or chute 11 having at its lower end, a screw conveyor 12 operated from motor 13 through a speed reducer 14 so as to cause a steady stream of the powdered material containing an excess of moisture, to continuously enter the tube mill for grinding. The rotation of the tube mill 10 may be caused by means of a large gear 15 meshing with a pinion 16 secured to any suitable powed shaft 17, the latter being rotatably mounted in bearings 18.

A housing 19 is formed around the hollow shaft at the delivery end of the tube mill 10, and a chute 20 leads to a screw conveyor housing 21 having therein a helical conveyor 22 for continuously removing the powdered material from the tube mill after grinding. I may connect a duct 23 to any suitable part of the system for withdrawing the steam generated during the grinding operation, but for the purpose of illustration, I have shown this duct as connected to the delivery housing 19. This duct preferably extends upwardly at an angle of about 45 degrees and then downwardly to form a short duct leg 24 and then a long duct leg 25, with a removable cleaning cap 26 positioned at the apex of the duct legs 23 and 24. A damper 27 having a control handle 28 is preferably provided in the duct leg 24 so as to control the volume of steam removed from the tube mill.

The lower ends of the ducts 25 are preferably connected to a horizontally extending manifold 28 which may be closed at one end with a cap 29, and is provided at the other end with an elbow 30, the long arm of which extends vertically and is closed at the top by means of a removable cleaning cap 31. The lower end of the elbow arm 30 is connected by pipe 32 to a sump 33 having an outlet pipe 34 near its bottom for discharging waste wash water. The pipe 34 preferably extends underneath the surface 35 or a body of water and a pipe 36 leads upwardly from the sump 33 to the suction side of an exhaust fan 37 which discharges into the open air through a vertical stack 38. By balancing the speed of the exhaust fan 37 against the height of the sump 33 above the body of water 35, the level 39 of water in the sump 33 is usually maintained above the outlet pipe 34 due to the partial vacuum created in the system so that all of the uncondensed gases go up the pipe 36 and through the exhaust fan 37 to stack 38. The pipe 41 and apparatus below said pipe, may conveniently be located below the floor level 47.

In order to remove any dust particles contained in the steam escaping through the manifold 28, and to aid in creating a suction or partical vacuum on the tube mill, I provide a water supply line 41 having a series of downwardly extending pipes 42 connected to the upperside of the manifold 28. Each of these pipes 42 has a nozzle 43 of standard design at its lower end which is preferably directed at an angle of about 30° to the axis of the manifold 28 so that a spray of water passes from said nozzle when a valve 45 on line 41 is opened. These sprays of water serve to direct the vapors, steam and gases along the manifold 28 to the right, as seen in Fig. 2, and on reaching the elbow arm 30, another spray of water is directed onto the gases by means of a pipe 46 passing through the cap 31. Upon reaching the sump 33, the mixture of water and uncondensed gases separates, the water going out of the drain pipe 34 and the gases going up the pipe 36 to the exhaust fan 37.

In operation, the hot, powdered calcined gypsum passes down the hopper 11, and is continuously moved by screw conveyer 12 into the tube mill 10. A continuous discharge of finely ground, hot material takes place into the housing 19 and out duct 20 into the conveyor housing 21, being moved continuously along said housing 21 to a discharge point. Exhaust fan 37 continuously draws steam and vapor from the interior of the tube mill through ducts 23, 24, 25, manifold 28, elbow arm 30, pipe 32, sump 33 and pipe 36, and forces the uncondensed gases into the stack 38. Water passes through pipe 41 when valve 45 is open, and then passes through branch pipes 42 and the top of the manifold 28, and out through spray nozzles 43. The sprays of water cause a condensation of the steam drawn from the tube mills, the waste water collecting in the sump 33, and then passing out through drain pipe 34 into the body of water 35. The uncondensed gases pass out through pipe 36, exhaust fan 37 and into the stack 38.

I would state in conclusion that while the illustrated example constitutes a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. The method of tube-milling calcined gypsum, which comprises continuously introducing coarsely ground hot calcined gypsum into a tube mill, reducing said gypsum to a fine powder by the operation of said tube mill, continuously discharging the finely ground material from said tube mill, withdrawing steam from said tube mill during the grinding operation by the application of a partial vacuum to said tube mill, spraying the steam withdrawn from said tube mill with water to condense the steam and separate out fine particles of the gypsum, collecting the water and particles of gypsum, and discharging the gases uncondensed by said water spray.

2. The combination with a plurality of tube mills for continuously receiving hot, coarsely ground, calcined gypsum and grinding said gypsum, and means for discharging said finely ground, hot, calcined gypsum continuously, of outlet ducts for withdrawing steam and vapors liberated by the grinding of said gypsum connected to said tube mills adjacent the discharge ports thereof, a manifold connecting said outlet ducts, means for spraying water in said manifold so as to wash the steam and vapors withdrawn from said tube mills, and means for collecting and discharging the wash water separated from the uncondensed gases.

3. Apparatus adapted for withdrawing and disposing of dust and moisture laden gases from disintegrators or the like, comprising a withdrawal duct, an exhaust fan, a passage connecting said duct and fan, a water spray in said passage for washing the gases and removing the dust and moisture therefrom, and means for collecting said dust and water and discharging the water separated from the uncondensed gases.

GEORGE L. HANN.